E. HUBER.
REVOLVING SCRAPER.

No. 176,226.    Patented April 18, 1876.

WITNESSES:
Francis McArdle,
John Goethals

INVENTOR:
E. Huber
BY
Munn
ATTORNEYS.

UNITED STATES PATENT OFFICE.

EDWARD HUBER, OF MARION, OHIO.

IMPROVEMENT IN REVOLVING SCRAPERS.

Specification forming part of Letters Patent No. 176,226, dated April 18, 1876; application filed March 13, 1876.

*To all whom it may concern:*

Figure 1:
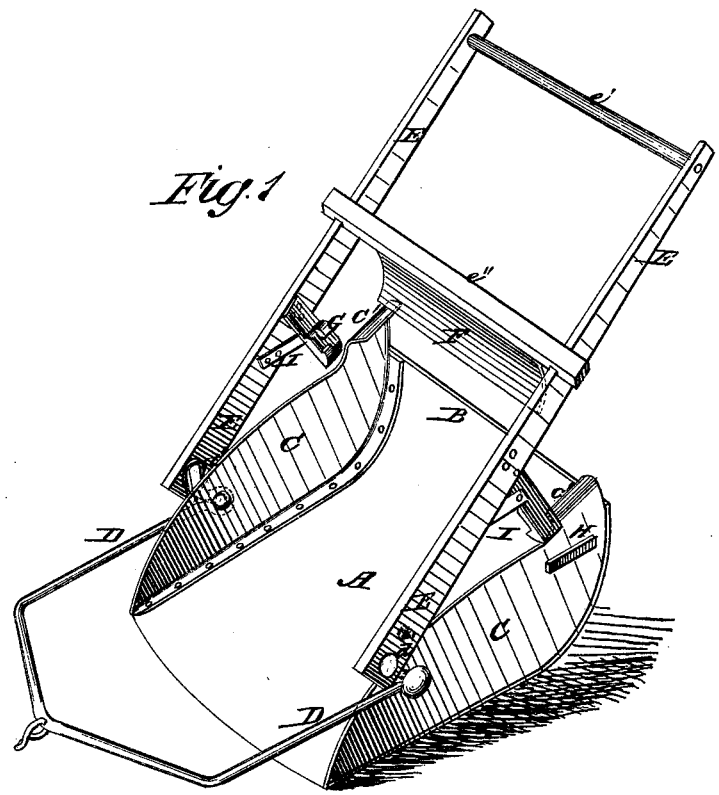
Figure 2:
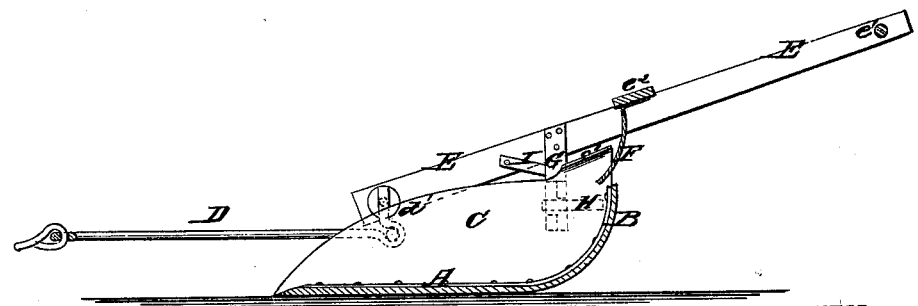

Be it known that I, EDWARD HUBER, of Marion, in the county of Marion and State of Ohio, have invented a new and useful Improvement in Revolving Dirt-Scraper, of which the following is a specification:

Figure 1 is a perspective view of my improved dirt-scraper. Fig. 2 is a longitudinal section of the same.

Similar letters of reference indicate corresponding parts.

The object of this invention is to furnish an improved scraper, simple in construction, strong, durable, effective in operation, and easily operated.

The invention consists in the inwardly-curved upward extensions formed upon the rear ends of the sides, and in the apron attached to the cross-bar of the handles to overlap the back of the scraper, as hereinafter fully described.

The scraper is made with a flat bottom, A, and a semi-cylindrical back, B. The bottom A and back B are made in one piece, and the forward edge is slightly curved, and is beveled or sharpened from its upper side. The sides C are made of wrought-iron, and with flanges upon their inner sides, to which are riveted the edges of the bottom A and back B, except at the forward corners, where they are welded. The forward ends of the sides are sharpened, so that they may enter the ground easily. The rear ends of the sides C have upward extensions $c'$ formed upon them, which are bent inward over the back B, to rest upon the earth when the scraper is tipped over, to prevent the earth from being scraped up by the said back B. D is the bail, which is pivoted to the upper forward parts of the sides C, and has short arms $d'$ projecting upward from said pivots to receive the forward ends of the handles E. The rear ends of the handles E are connected by a round, $e^1$. The handles E, over or a little in the rear of the back B, are connected by a cross-bar, $e^2$, to which is attached an apron, F, which overlaps the upper edge of the back B, to prevent the earth from slipping over said back. To the handles E are attached downwardly-projecting arms G, the faces of which have transverse grooves formed in them to receive a short longitudinal flange, H, formed upon the rear parts of the sides C. The faces of the arms G, above the forward parts and below the rear parts of the grooves, are cut away, so that when slipped back upon the flanges H, by raising the handles to dump the load, the rear end of said flanges may rise out of said grooves, and so that the forward ends of said flanges may rise into said grooves, when the scraper revolves again into place. The arms G are strengthened by braces, I attached to them and to the handles E.

Having thus described my invention, I claim as new and desire to secure by Letters Patent—

1. The inwardly-curved upward extensions $c'$, formed upon the rear ends of the sides C, substantially as herein shown and described.

2. The apron F, attached to the cross-bar $e^2$ of the handles E, to overlap the back B of the scraper, substantially as herein shown and described.

EDWARD HUBER.

Witnesses:
FRANCIS M. SCRIBNER,
JOHN F. McNEAL.